Feb. 10, 1931.  M. D. REISS  1,791,843
POULTRY PLUCKING MACHINE
Filed July 19, 1928    3 Sheets-Sheet 1

INVENTOR
Morris D. Reiss
BY
ATTORNEYS

Feb. 10, 1931.  M. D. REISS  1,791,843
POULTRY PLUCKING MACHINE
Filed July 19, 1928   3 Sheets-Sheet 2
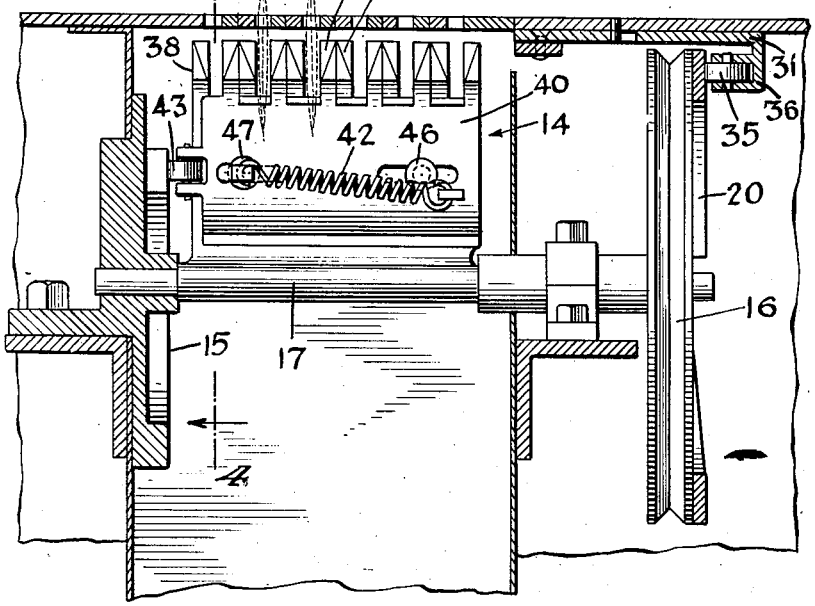
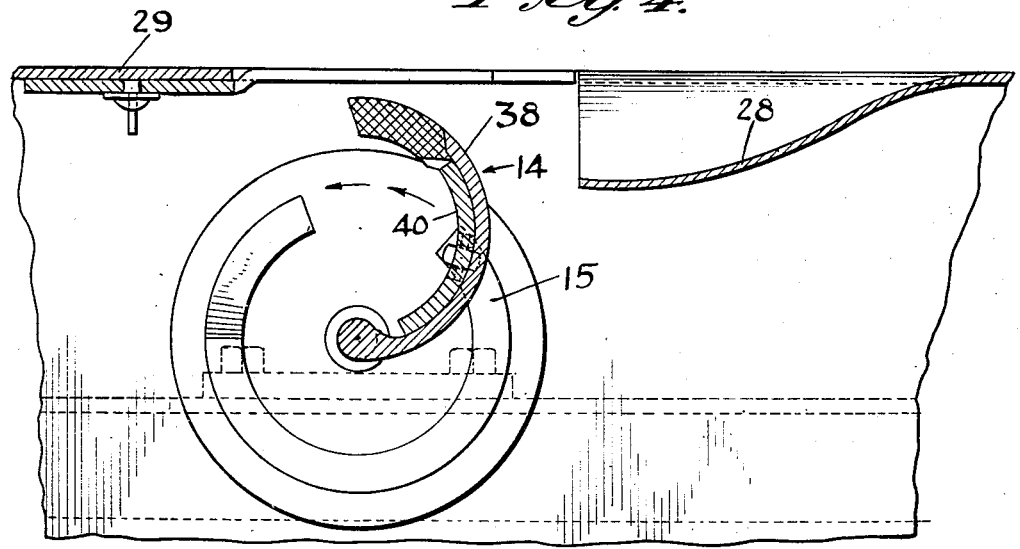

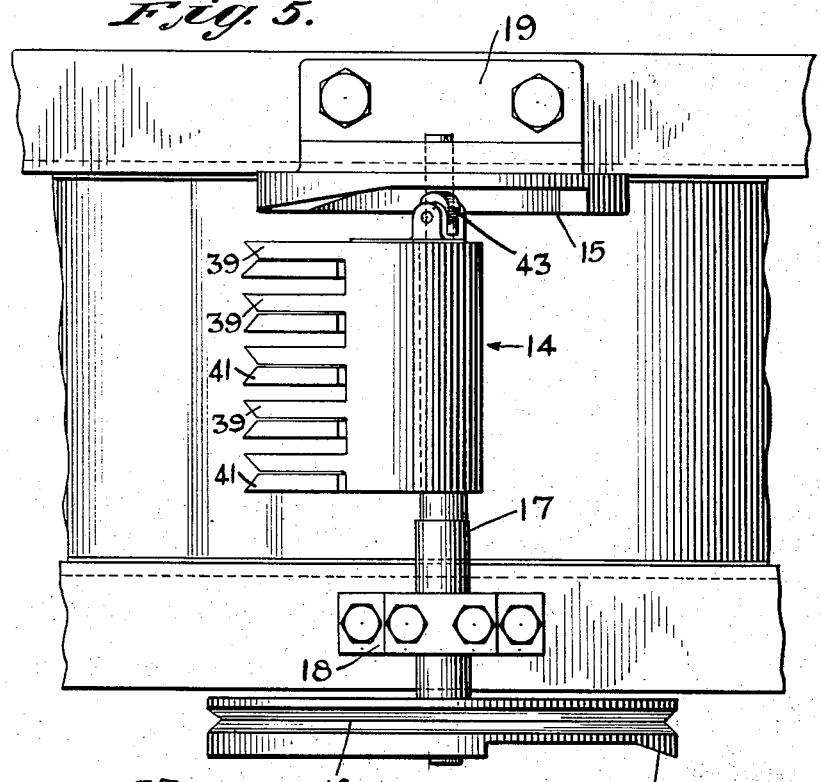
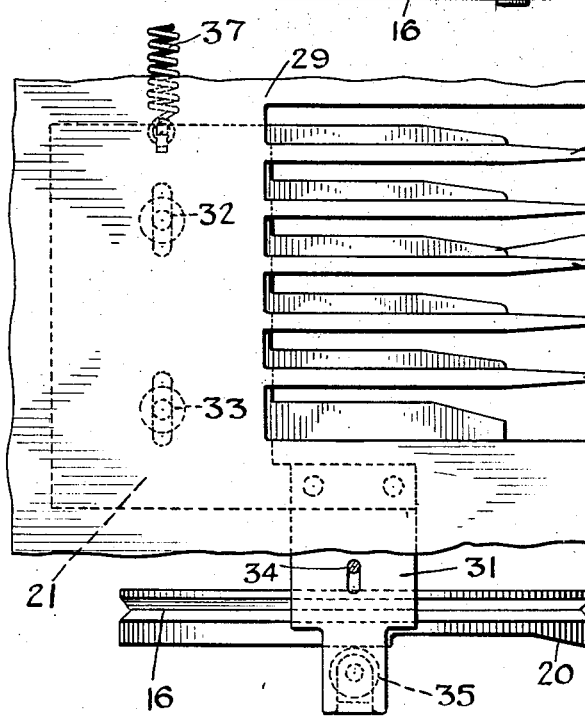

Patented Feb. 10, 1931

1,791,843

UNITED STATES PATENT OFFICE

MORRIS D. REISS, OF NEW YORK, N. Y.

POULTRY-PLUCKING MACHINE

Application filed July 19, 1928. Serial No. 293,802.

This invention relates to improvements in poultry plucking machines. One of the objects of my invention is to provide a poultry plucking machine which will be simple in operation and by means of which the feathers may be removed from any kind of poultry without abrading or otherwise injuring the skin of the fowl.

A further object of my improved machine is to provide a poultry plucking device by means of which the plucked feathers are collected in a convenient receptacle from which they may be removed.

Further objects of the invention will be apparent from the specification and drawings in which Fig. 1 is a top plan view of the device.

Fig. 3 is a detailed sectional view of the rotary gripper which is one of the principal features of my invention, showing the teeth of said rotary gripper in the open position. Fig. 3 also shows the operating mechanism for the cam which actuates the grid or sliding gripper on the top of the machine which is shown in Fig. 1.

Fig. 4 is a section on the line 4—4 showing the principal cam which operates the rotary gripper shown in Fig. 3.

Fig. 5 is a plan view of the machine with the sliding gripper on the cover removed showing the rotary gripper with the teeth in the closed position.

Fig. 6 is a detailed plan view of the sliding gripper located at the top of the device, also illustrated in Fig. 1, showing the teeth of the sliding gripper open.

Figure 1:
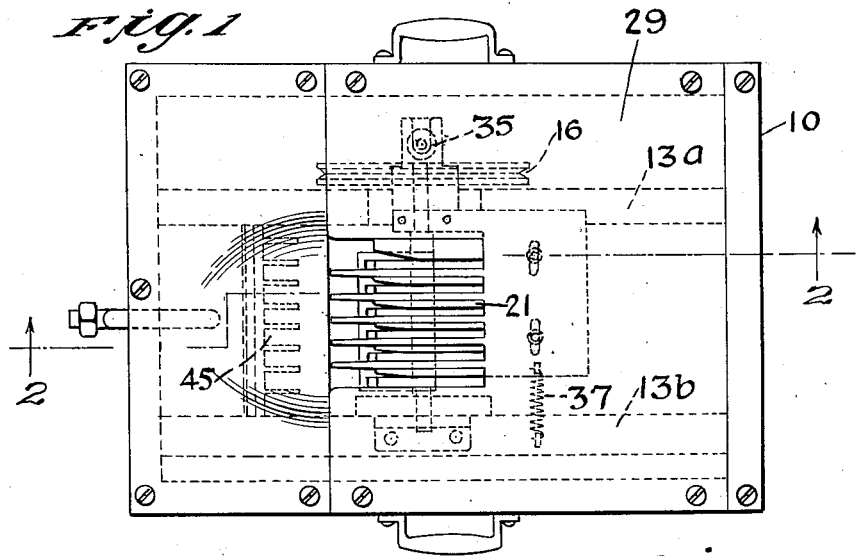
Figure 2:
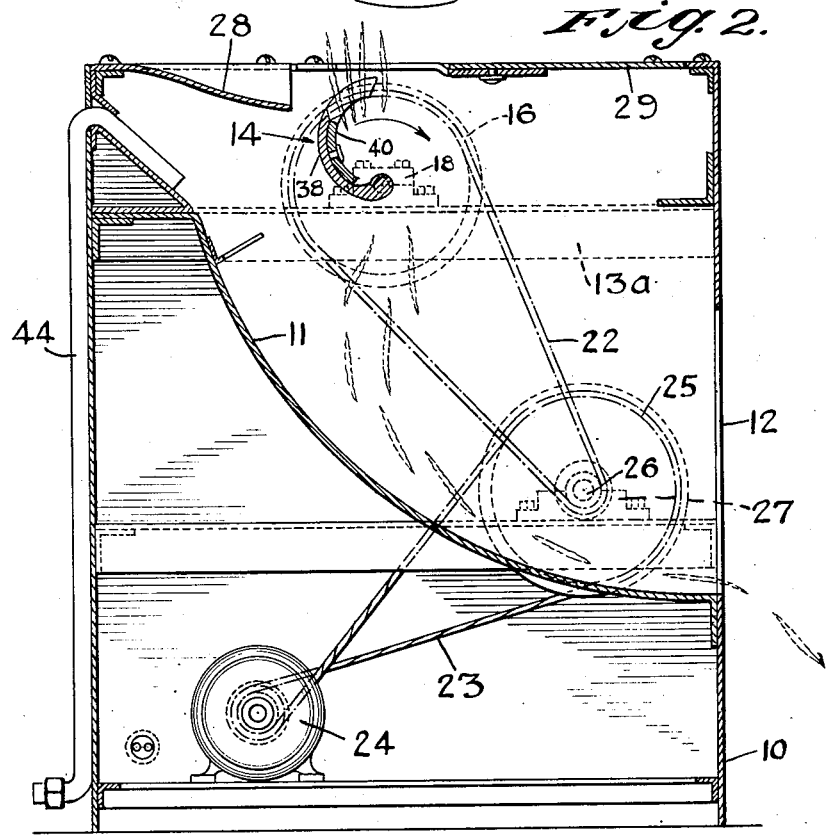
Fig. 2 is a sectional view along the line 2—2 of Fig. 1 showing the actuating and driving mechanism for the operative part of the machine.

The device comprises a housing 10 in which a diagonal trough 11 is mounted. This trough 11 communicates with the outlet opening 12 of the housing 10. The upper end of the trough 11 has horizontal angle irons 13a and 13b adjacent thereto. The device comprises a rotary plucker or gripper 14 mounted on the shaft 17, which is carried by the bearings 18 and 19. A stationary cam 15 is mounted upon one of said bearings and this cam serves to control the position of the laterally movable fingers of the rotary plucking device. The shaft 17 is provided with a pulley 16 which is driven by a belt 22, which passes around a pulley located on the shaft 26, mounted in bearings 27. Said shaft 26 is provided with a pulley 25 which is driven by a belt 23 passing around a pulley located upon the shaft of the electric motor 24. The rotary gripper or plucker 14 comprises an outer plate 38 mounted upon the shaft 17, and an inner laterally slidable plate 40. Said inner slidable plate 40 is guided in its sliding movement with respect to the outer member 38 by means of grooves into which project pins 46 and 47 connected to the outer plate or member 38. A tension spring 42 has one end connected to the inner sliding member 40, and its other end is connected to the pin 47, which is fixed to the outer member 38, so that the cam roller 43 of the inner sliding member 40 is urged against the fixed face cam 15. As shown in Figs. 3 and 4, the face cam 15 is discontinuous at the top portion thereof. For example, in the position shown in Fig. 4, the cam roller 43 is about to pass off the adjacent end of the cam 15. At this point, the fingers 41 of the inner slidable member 40 are in the position illustrated in Fig. 3 so that the feathers of the fowl can project between each movable tooth 41 and its adjacent fixed tooth 39. Likewise, at this point, the said plucking fingers are in substantially their highest position as shown in Fig. 4. As the plucking fingers move downwardly, the cam roller 43 is free to move into the discontinuous portion of the face cam 15, so that the tension spring 42 is free to operate the inner slidable member 40, to cause the feathers to be gripped between the plucker teeth. The feathers are thus plucked and moved downwardly. However, as soon as the roller 43 contacts with the other edge of the cam 15 (shown at the left in Fig. 4), the said plucking fingers are again actuated to release the feathers so that they fall down upon the trough 11. While I prefer to continuously revolve the plucking device 14, I do not wish to be limited to said continuous turning movement.

The operation of the device is as follows:—

The fowl whose feathers are to be plucked is placed on the top of the machine on the inclined platform 28 so that the feathers are in contact with the teeth of the sliding gripper 21. Adjacent the inclined platform 28 is the top plate 29 having integral therewith the stationary pointed teeth 30—30—30. The teeth of the sliding gripper 21 operate in movable relation to the fixed teeth 30. The sliding gripper 21 consists essentially of a small rectangular plate slidably connected to the underside of cover 29 and having the extension 31. The gripper plate 21 and its extension 31 slide as a unit, being horizontally slidable on the pins 32, 33 and 34. This horizontal movement is produced by means of the cam 20 cooperating with the cam roller 35 mounted on the fork 36 of the extension 31. Fig. 6 shows the sliding gripper in the open position, it being apparent that the teeth of the sliding gripper 21 may move practically the entire distance horizontally between the teeth 30—30—30. The sliding gripper 21 is held in the open position shown in Fig. 6, by means of the face cam 20 which is connected to and which turns with the pulley 16. Said cam 20 operates against the tension of the spring 37. The gripping faces of the plucker teeth may be knurled.

The sliding gripper 21 and the rotary gripper or plucking device 14 are simultaneously in the open position and the action of the sliding gripper is primarily that of a protective device so that the feathers but not the skin of the fowl may pass between the teeth of the gripper 21 and the stationary teeth 30 to be pulled out by the rotary gripper 14. That is, the sliding gripper 21 acts to force the feathers together into groups which are then pulled out by the rotary gripper mechanism. It will be apparent that the feeding of the feathered portion of the fowl is done by hand. The detached feathers fall into the trough 11 and are forced through opening 12 by means of the blower 44. In this trough there is positioned a forked member 45 which serves to prevent any upward movement of any detached feathers, the feathers being blown through the opening 12 into any convenient receptacle not here shown.

It will be apparent that changes in this construction may be made without departing from the spirit of this invention.

Having fully described my invention, what I claim is:

1. In a plucking machine, the combination of a pair of relatively movable members having cooperating teeth which are adapted to grip the feathers of the fowl to be plucked adjacent the roots of said feathers, means adapted to produce a relative movement between the said members to cause their teeth to engage or release the feathers, and plucking means adapted to engage and pluck the feathers while they are gripped by said relatively movable members.

2. A plucking machine comprising a pair of relatively movable members having cooperating teeth adapted to grip the feathers of the fowl to be plucked adjacent the roots of said feathers, plucking mechanism comprising a second pair of relatively movable members having cooperating teeth adapted to grip the outer portions of the said feathers, control mechanism adapted to produce substantially simultaneous relative movement between said two sets of members so that their teeth substantially simultaneously grip the feathers, and operating mechanism adapted to cause the second set of members to move away from the first set of members to pluck the feathers while said feathers are so gripped.

3. In a plucking machine, the combination of a shaft having a first member mounted thereon, the free end of said first member being provided with teeth, a second member movably mounted with respect to said first member so that said second member can move laterally with respect to said first member, said second member having teeth adapted to cooperate with said first mentioned teeth to grip feathers between them means adapted to actuate said shaft and control means adapted to control the relative position between the teeth of the said members during the movement of the said shaft, said control means comprising a spring adapted to cause said teeth to be moved into the gripping position and a cam adapted to urge said teeth away from the gripping position.

4. In a plucking machine, the combination of a pair of relatively movable combs adapted to operate adjacent roots of the feathers to prevent the skin from being injured when the feathers are plucked, control means adapted to control the relative positions of the said combs, and plucking means adapted to operate to pluck the feathers when the teeth of said combs are substantially close to each other to prevent the skin of the fowl from being pulled too far along with the feathers.

In testimony whereof I affix my signature.

MORRIS D. REISS.